United States Patent
Lim et al.

(10) Patent No.: US 11,995,795 B2
(45) Date of Patent: May 28, 2024

(54) IMAGE PROCESSING DEVICE AND METHOD FOR OPERATING SAME

(71) Applicant: SAMSUNG ELECTRONICS CO., LTD., Suwon-si (KR)

(72) Inventors: Kyungmin Lim, Suwon-si (KR); Jaesung Lee, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 17/413,404

(22) PCT Filed: Oct. 10, 2019

(86) PCT No.: PCT/KR2019/013301
§ 371 (c)(1),
(2) Date: Jun. 11, 2021

(87) PCT Pub. No.: WO2020/122389
PCT Pub. Date: Jun. 18, 2020

(65) Prior Publication Data
US 2022/0067880 A1    Mar. 3, 2022

(30) Foreign Application Priority Data
Dec. 11, 2018  (KR) .......... 10-2018-0159118

(51) Int. Cl.
*G06T 3/40* (2006.01)
*G06N 3/04* (2023.01)
(Continued)

(52) U.S. Cl.
CPC ............. *G06T 3/4046* (2013.01); *G06N 3/04* (2013.01); *G06T 7/73* (2017.01);
(Continued)

(58) Field of Classification Search
CPC .............. G06T 3/4046; G06T 7/73; G06T 2207/20016; G06T 2207/20081; G06T 2207/30168; G06N 3/04
See application file for complete search history.

(56) References Cited

U.S. PATENT DOCUMENTS 7,675,524 B1    3/2010 Miller et al.
10,510,325 B2 * 12/2019 Jin ............................ G06T 1/60
(Continued)

FOREIGN PATENT DOCUMENTS

CN    105574924 A    5/2016
EP    0534698 A2    3/1993
(Continued)

OTHER PUBLICATIONS

Fang, L., et al., "Novel 2-D MMSE Subpixel-Based Image Down-Sampling", IEEE Transactions on Circuits and Systems for Video Technology, vol. 22, No. 5, May 2012, pp. 740-753.
(Continued)

*Primary Examiner* — Bobbak Safaipour
*Assistant Examiner* — Jongbong Nah
(74) *Attorney, Agent, or Firm* — Sughrue Mion, PLLC

(57) ABSTRACT

An image processing apparatus includes a memory storing one or more instructions, and a processor executing the one or more instructions stored in the memory, wherein the processor uses one or more deep neural networks to generate first feature maps from a first image, generate second feature maps for each of subpixels based on the first feature maps and position information of each of the subpixels arranged in a display, and determine result values for each of the subpixels based on the second feature maps.

9 Claims, 12 Drawing Sheets

(51) Int. Cl.
    *G06T 3/4046*     (2024.01)
    *G06T 7/73*     (2017.01)

(52) U.S. Cl.
    CPC ............... *G06T 2207/20016* (2013.01); *G06T 2207/20081* (2013.01); *G06T 2207/30168* (2013.01)

(56) References Cited

U.S. PATENT DOCUMENTS

| | | | |
|---|---|---|---|
| 2016/0259994 A1 | 9/2016 | Ravindran et al. | |
| 2017/0301737 A1 | 10/2017 | Gu | |
| 2018/0130180 A1* | 5/2018 | Wang | H04N 19/463 |
| 2018/0137611 A1 | 5/2018 | Kwon et al. | |
| 2018/0350110 A1* | 12/2018 | Cho | G06N 3/045 |

FOREIGN PATENT DOCUMENTS

| | | |
|---|---|---|
| EP | 3 326 366 B1 | 4/2019 |
| KR | 1020160051154 A | 5/2016 |
| KR | 1020180004898 A | 1/2018 |
| KR | 10-2018-0048986 A | 5/2018 |
| KR | 1020180131073 A | 12/2018 |
| WO | 2018170393 A2 | 9/2018 |

OTHER PUBLICATIONS

International Search Report (PCT/ISA/210) dated Jan. 16, 2020 issued by the International Searching Authority in International Application No. PCT/KR2019/013301.
Communication dated Jul. 5, 2022, issued by the China National Intellectual Property Administration in Chinese Application No. 201980082417.8.
Communication dated Jan. 4, 2023 by the Chinese Patent Office for Chinese Patent Application No. 201980082417.8.
Communication dated Dec. 13, 2021 by the European Patent Office in counterpart European Patent Application No. 19895723.5.
Li, Yue et al., "Learning a Convolutional Neural Network for Image Compact-Resolution", IEEE Transactions on Image Processing, vol. 28, No. 3, Sep. 28, 2018, pp. 1092-1107, XP011703593. (16 pages total).
Fang, Lu et al., "Subpixel Rendering: From Font Rendering to Image Subsampling", IEEE Signal Processing Magazine, May 1, 2013, vol. 30, No. 3, pp. 177-189, XP011499540. (7 pages total).
Lecun, Yann et al., "Convolutional Networks and Applications in Vision", IEEE International Symposium on Circuits and Systems, May 30, 2010, pp. 253-256, XP 008130256. (4 pages total).
Zeiler, Matthew D. et al., "Deconvolutional Networks", IEEE Conference on Computer Vision and Pattern Recognition, Jun. 13, 2010, pp. 2528-2535, XP031725786. (8 pages total).
Office Action dated Apr. 6, 2023, issued by Korean Patent Office in Korean Patent Application No. 10-2018-0159118.

* cited by examiner

FIG. 4
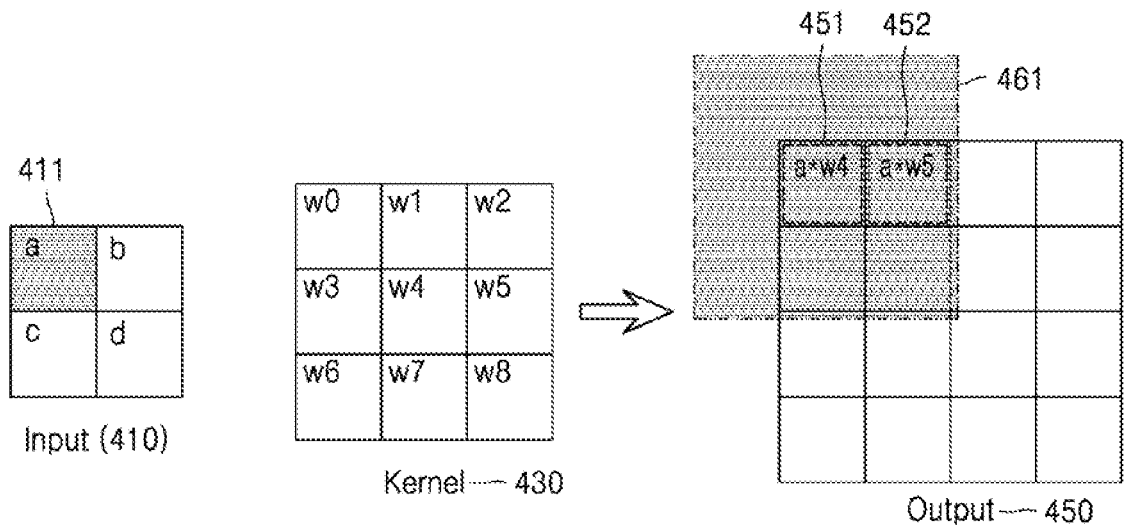
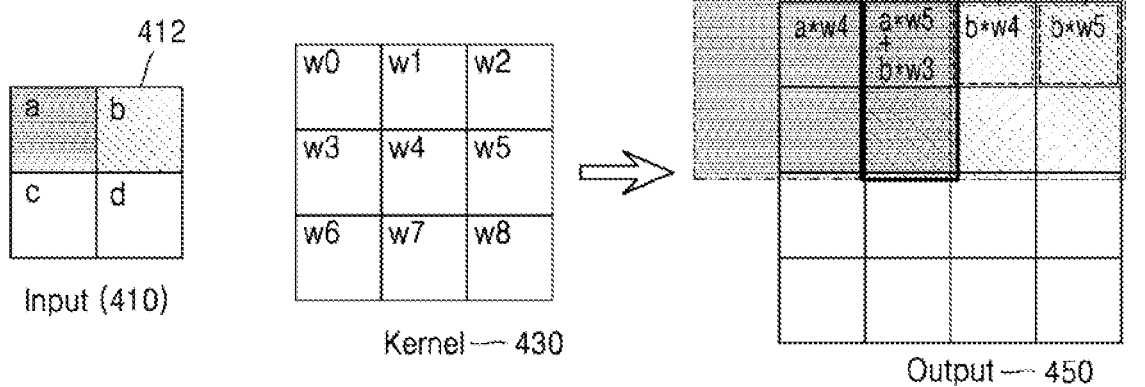

IMAGE PROCESSING DEVICE AND METHOD FOR OPERATING SAME

TECHNICAL FIELD

Various embodiments relate to an image processing apparatus for processing an image by using a deep neural network and a method of operating the image processing apparatus, and more particularly, to an image processing apparatus capable of performing subpixel rendering by using a deep neural network and a method of operating the image processing apparatus.

BACKGROUND ART

As data traffic has increased exponentially with the development of computer technology, artificial intelligence (AI) has become an important trend to lead future innovation. Because AI is a way to imitate human thinking, it may be infinitely applicable to virtually all industries. Examples of AI may include pattern recognition, machine learning, expert systems, neural networks, and natural language processing.

A neural network may model the biological characteristics of human neurons by mathematical representations and use an algorithm mimicking the human learning ability. The neural network may generate a mapping between input data and output data through the algorithm, and the ability to generate the mapping may be represented as the learning ability of the neural network. Also, the neural network may have a generalization ability to generate correct output data for input data that has not been used for learning, based on the learning results.

Moreover, an image processing apparatus may perform subpixel rendering to increase the cognitive resolution of a display by adjusting a value in units of subpixels included in one pixel. In the case of an LCD display, because the area of a light emitting element is wider than a pixel area and subpixels are symmetrically arranged, when subpixel rendering is performed, the value of subpixels may change in conjunction therewith and thus the value of subpixels may change gradually in one pixel. On the other hand, in the case of a microLED display, because the weight of a blank region is high (the light emitting element area is smaller than the pixel area) and subpixels are asymmetrically arranged, when subpixel rendering is performed, the value of subpixels may change greatly in one pixel. Accordingly, in the case of the microLED display, color bleeding may occur, unlike in the LCD display. Also, in the case of subpixel rendering using a fixed filter, it may be difficult to improve details in an irregular region that is difficult to predict.

DESCRIPTION OF EMBODIMENTS

Technical Problem

Various embodiments may provide an image processing apparatus that may be suitable for a display in which the weight of a blank region is high and subpixels are asymmetrically arranged and may adaptively perform subpixel rendering according to the characteristics of an input image, and a method of operating the image processing apparatus.

Advantageous Effects of Disclosure

The image processing apparatus according to an embodiment may perform subpixel rendering suitable for a display in which the weight of a blank region is high and subpixels are asymmetrically arranged.

The occurrence of color bleeding in an output image on which subpixel rendering has been performed may be prevented by the image processing apparatus according to an embodiment.

The image processing apparatus according to an embodiment may adaptively perform subpixel rendering according to the characteristics of an input image, thus improving details even in a region that is difficult to predict (an irregular region).

BRIEF DESCRIPTION OF DRAWINGS

FIGS. 3 and 4 are diagrams referred to for describing an upscaler according to an embodiment.

BEST MODE

Figure 1:
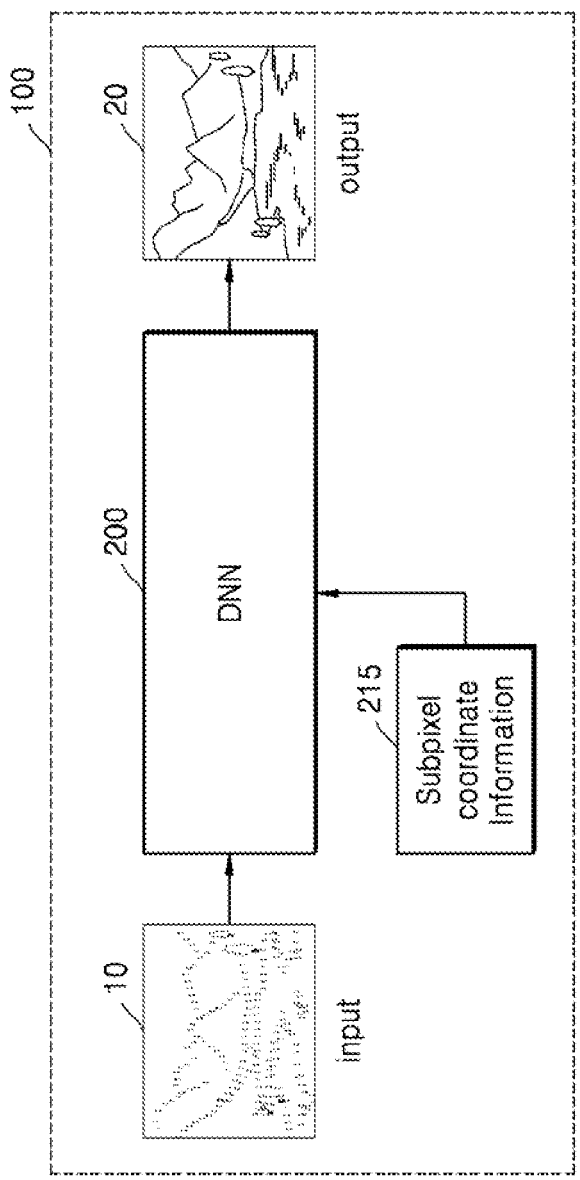
FIG. 1 is a diagram illustrating a method of processing an image by an image processing apparatus by using a deep neural network, according to an embodiment.

According to an embodiment, an image processing apparatus includes a memory storing one or more instructions, and a processor executing the one or more instructions stored in the memory, wherein the processor uses one or more deep neural networks to generate first feature maps from a first image, generate second feature maps for each of subpixels based on the first feature maps and position information of each of the subpixels arranged in a display, and determine result values for each of the subpixels based on the second feature maps.

According to an embodiment, the processor may generate third feature maps by performing a convolution operation between the first image and first kernels and generate the first feature maps by upscaling the third feature maps.

According to an embodiment, the one or more deep neural networks may include a deconvolution layer, and the processor may upscale the third feature maps by performing a deconvolution operation between the third feature maps and second kernels in the deconvolution layer.

According to an embodiment, the subpixels may include first to third subpixels, and the processor may generate first sub feature maps based on the first feature maps and position information of the first subpixel, generate second sub feature maps based on the first feature maps and position information of the second subpixel, and generate third sub feature maps based on the first feature maps and position information of the third subpixel.

According to an embodiment, each of the first sub feature maps may include features having a same position relationship with the first subpixel among features included in each of the first feature maps, each of the second sub feature maps may include features having a same position relationship with the second subpixel among features included in each of the first feature maps, and each of the third sub feature maps may include features having a same position relationship with the third subpixel among features included in each of the first feature maps.

According to an embodiment, the processor may determine a weight of each of the first sub feature maps based on features included in each of the first sub feature maps and a proximity to the first subpixel, determine a weight of each of the second sub feature maps based on features included in each of the second sub feature maps and a proximity to the second subpixel, determine a weight of each of the third sub feature maps based on features included in each of the third sub feature maps and a proximity to the third subpixel, and determine result values for each of the subpixels by applying weights to each of the first to third sub feature maps.

According to an embodiment, the processor may generate a first result image including first result values for the first subpixel by performing a convolution operation between the first sub feature maps and third kernels, generate a second result image including second result values for the second subpixel by performing a convolution operation between the second sub feature maps and fourth kernels, generate a third result image including third result values for the third subpixel by performing a convolution operation between the third sub feature maps and fifth kernels, and output a second image by using the first to third result images.

According to an embodiment, a second image may be output based on a result value for each of the subpixels.

According to an embodiment, the first image and the second image may have a same resolution.

According to an embodiment, the processor may generate a first virtual image by using the second image and calculate a first error for a U value and a second error for a V value between the first virtual image and a label image, generate a second virtual image by performing subpixel rendering on the label image and calculate a third error of a Y value between the second virtual image and an output image, and train the one or more deep neural networks to minimize the first to third errors.

According to an embodiment, the second image and the second virtual image may have a first resolution, the label image and the first virtual image may have a second resolution, and the second resolution may be greater than the first resolution.

According to an embodiment, a method of operating an image processing apparatus that processes an image by using one or more deep neural networks includes generating first feature maps from a first image, generating second feature maps for each of subpixels based on the first feature maps and position information of each of the subpixels arranged in a display, and determining result values for each of the subpixels based on the second feature maps.

According to an embodiment, a computer program product includes one or more computer-readable recording mediums having stored therein a program for performing an operation of generating first feature maps from a first image, an operation of generating second feature maps for each of subpixels based on the first feature maps and position information of each of the subpixels arranged in a display, and an operation of determining result values for each of the subpixels based on the second feature maps.

Mode of Disclosure

Terms used herein will be briefly described and then the disclosure will be described in detail.

The terms used herein are those general terms currently widely used in consideration of functions in the disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the disclosure. Thus, the terms used herein should be understood not as simple names but based on the meanings of the terms and the overall description of the disclosure.

Throughout the specification, when something is referred to as "including" an element, another element may be further included unless specified otherwise. Also, as used herein, the terms such as "units" and "modules" may refer to units that perform at least one function or operation, and the units may be implemented as hardware or software or a combination of hardware and software.

Hereinafter, embodiments of the disclosure will be described in detail with reference to the accompanying drawings so that those of ordinary skill in the art may easily implement the embodiments. However, the disclosure may be embodied in many different forms and should not be construed as being limited to the embodiments set forth herein. Also, portions irrelevant to the description of the disclosure will be omitted in the drawings for a clear description of the disclosure, and like reference numerals will denote like elements throughout the specification.

FIG. 1 is a diagram illustrating a method of processing an image by an image processing apparatus by using a deep neural network, according to an embodiment.

Referring to FIG. 1, an image processing apparatus 100 according to an embodiment may receive a first image 10 (input) and generate a second image 20 (output) by performing subpixel rendering on the first image 10 (input) by using a deep neural network 200.

The image processing apparatus 100 according to an embodiment may extract feature information about the first image 10 (input) and perform subpixel rendering based on the extracted feature information and position information 215 (e.g., subpixel coordinate information) of subpixels arranged in a display on which the second image 20 (output) is to be displayed. Accordingly, the image processing apparatus 100 may perform subpixel rendering suitable for a display (e.g., a micro LED display) in which the weight of a blank region is high and subpixels are asymmetrically arranged.

Also, the image processing apparatus 100 may perform subpixel rendering adaptive to the characteristics of the first image 10 by using the deep neural network 200. For example, the image processing apparatus 100 may generate the second image 20 in which details about a predictable region and a region that is difficult to predict (an irregular region) are improved in the first image 10.

A method of performing subpixel rendering on the first image 10 by the image processing apparatus 100 according to an embodiment by using a deep neural network will be described in detail with reference to the drawings described below.

Figure 2:
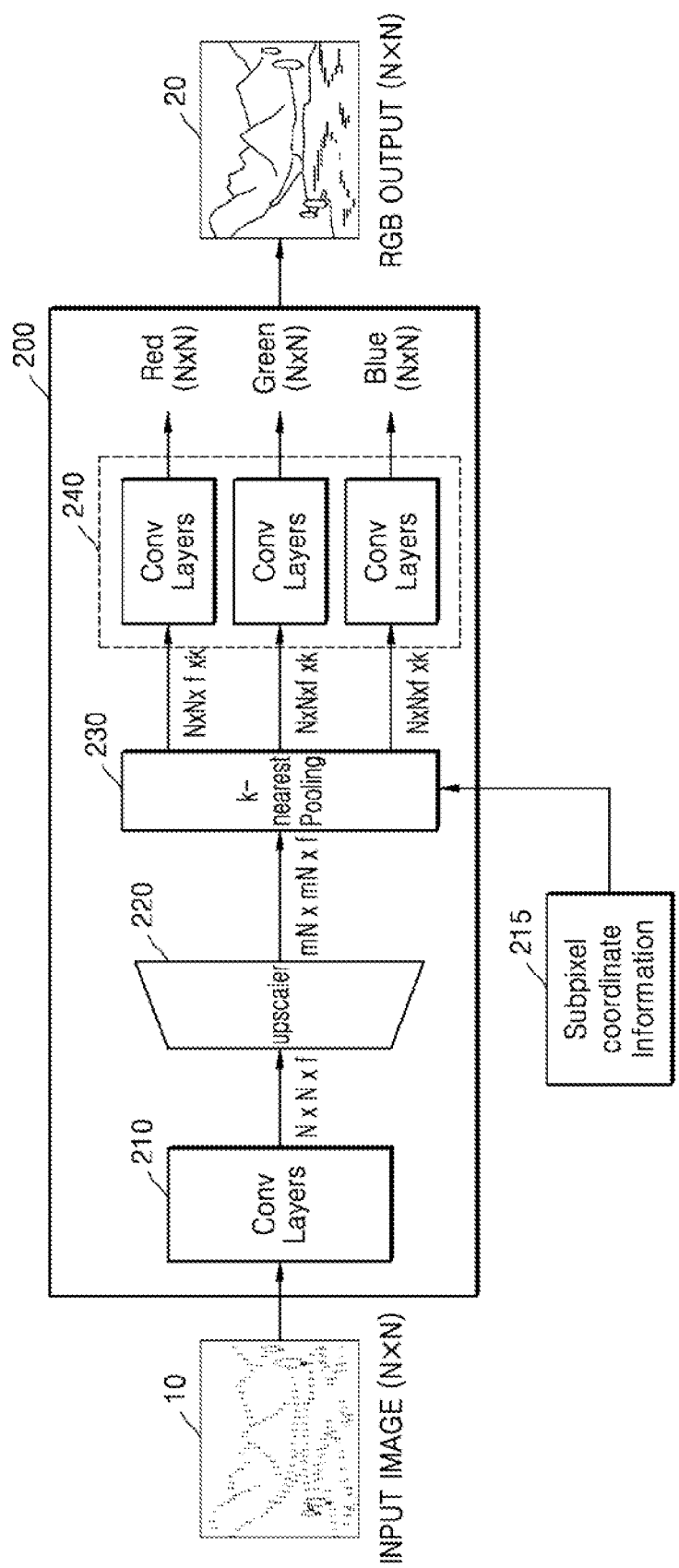
FIG. 2 is a diagram illustrating a structure of a deep neural network according to an embodiment.

FIG. 2 is a diagram illustrating a structure of a deep neural network according to an embodiment.

Referring to FIG. 2, the deep neural network 200 according to an embodiment may include a first convolution operator 210, an upscaler 220, a pooling operator 230, and a second convolution operator 240.

The first convolution operator 210 according to an embodiment may include one or more convolution layers. In each of the convolution layers, a convolution (deconvolution) operation may be performed between one or more images (or feature maps) input to the convolution layer and a kernel, and one or more generated images (or feature maps) may be output as a result of the convolution operation. Also, one or more feature maps output from the current convolution layer may be input to the next convolution layer.

For example, the image processing apparatus 100 may input an input image to the first convolution operator 210. In this case, the size of the input image may be N×N and it may include a plurality of channels. The image processing apparatus 100 may generate and output first feature maps by performing a convolution operation between the input image and first kernels in a plurality of convolution layers included in the first convolution operator 210. The size of the first feature maps output from the first convolution operator 210 may be N×N, and the number of first feature maps may be f. In this case, the number of first feature maps may be a preset value.

The upscaler 220 according to an embodiment may increase the size (resolution) of the first feature maps input to the upscaler 220, which will be described in detail with reference to FIGS. 3 and 4.

Figure 3:
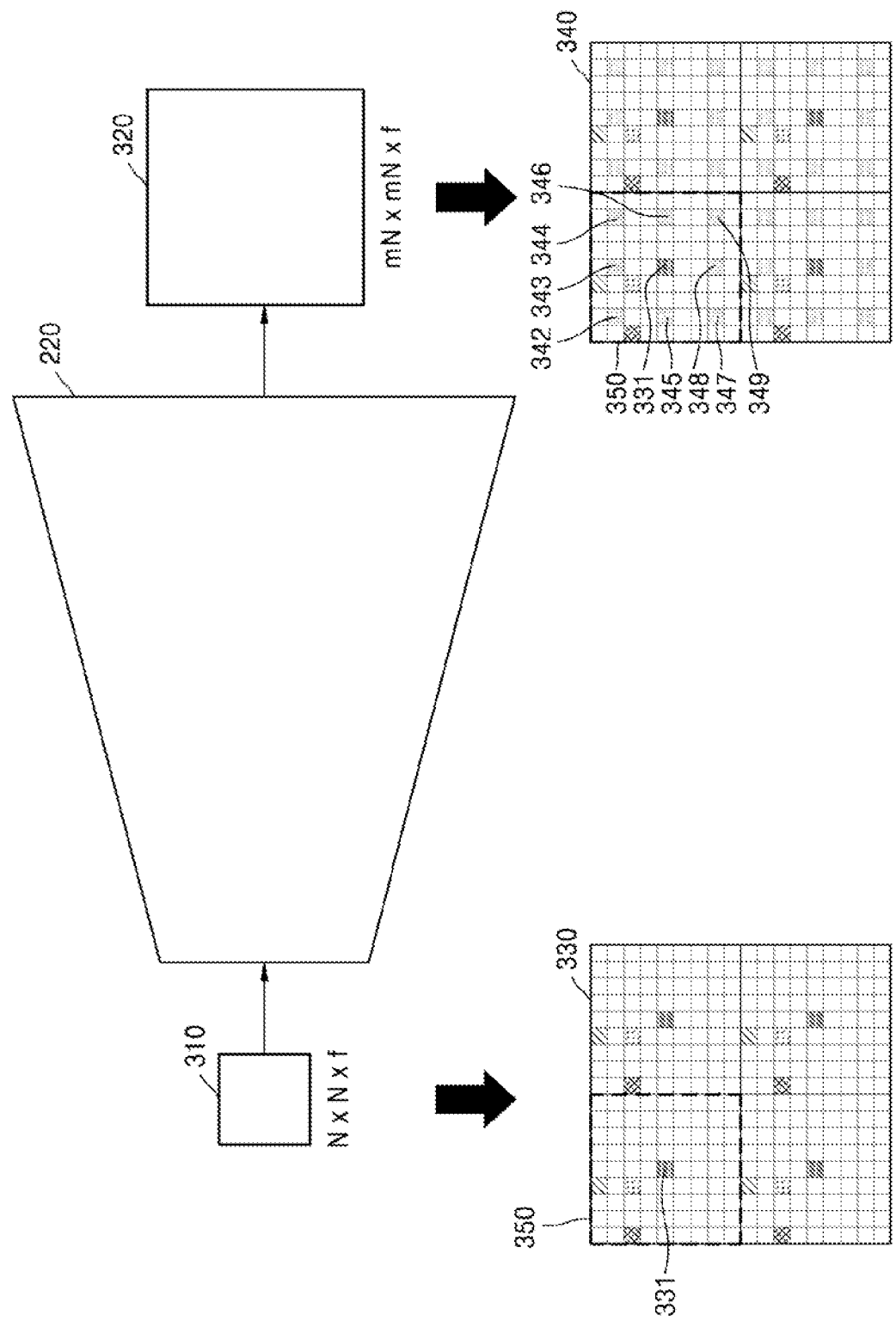

FIGS. 3 and 4 are diagrams referred to for describing an upscaler according to an embodiment.

Referring to FIG. 3, the upscaler 220 according to an embodiment may include a deconvolution layer. The image processing apparatus 100 may input first feature maps 310 to the deconvolution layer, perform a deconvolution operation between the first feature maps 310 and second kernels, and generate second feature maps 320 as a result of the deconvolution operation. The deconvolution operation may be generally used to generate an output image larger than the size of an input image, but is not limited thereto. The sizes of the second feature maps generated as a result of the deconvolution operation may be larger than the size of the first feature maps input to the deconvolution layer. A process in which the deconvolution operation is processed will be described with reference to FIG. 4.

FIG. 4 is a diagram referred to for describing a deconvolution operation.

In FIG. 4, for convenience of description, it is assumed that input data 410 has a size of 2×2, the size of a kernel applied to the input data 410 is 3×3, the size of a stride is 2, the size of output data 450 is 4×4, and a padding value is 1.

Referring to FIG. 4, the image processing apparatus 100 may perform a deconvolution operation by applying a kernel 430 to an upper left pixel 411 of the input data 410. That is, the image processing apparatus 100 may respectively map values, which are obtained by multiplying a pixel value "a" by each of weight values w0 to w8 included in the kernel 430, to pixels included in a first region 461 of the output data 450. In this case, the image processing apparatus 100 may determine the start position of the first region 461 by considering that the padding value is 1 (e.g., the start point of the first region may be a point moved by one pixel to the left and up sides from an upper left pixel 451 of the output data).

The image processing apparatus 100 may map a value "a*w4" obtained by multiplying the pixel value "a" by the weight w4 to a first pixel 451 of the output data 450 and may map a value "a*w5" obtained by multiplying the pixel value "a" by the weight w5 to a second pixel 452 of the output data 450.

Also, the image processing apparatus 100 may respectively map values, which are obtained by multiplying a pixel value "b" of an upper right pixel 412 of the input data 410 by each of the weight values w0 to w8 included in the kernel 430, to pixels included in a second region 462 moved by two pixels from the first region 461 of the output data 450. For example, a value "b*w3" obtained by multiplying the pixel value "b" of the input data 410 by the weight w3 may be mapped to the second pixel 452 of the output data 450, a value "b*w4" obtained by multiplying the pixel value "b" by the weight w4 may be mapped to a third pixel 453 of the output data 450, and a value "b*w5" obtained by multiplying the pixel value "b" by the weight w5 may be mapped to a fourth pixel 454 of the output data 450.

In this case, when data that is the target of the deconvolution operation is moved by one pixel in the input data 410, the number of pixels by which a region where the result value of the deconvolution operation is mapped (a mapping region) is moved in the output data 450 will be referred to as a stride. For example, the mapping region may be moved by one pixel; however, as illustrated in FIG. 4, the mapping may be performed by moving by two or more pixels from the first region 461 to the second region 462. Thus, the size of the output data (output image) may be determined according to the size of the stride.

In the same way, while the target of the deconvolution operation is scanned by one pixel from left to right and from top to bottom in the input data 410, the weight values included in the kernel may be multiplied and the results thereof may be mapped to the output data 450.

Moreover, referring to FIG. 4, the first region 461 and the second region 462 may overlap each other. Also, a plurality of values may be mapped to each of the pixels included in the overlapping region, and the value of the pixel of the output data 450 may be determined as the sum of the values mapped to the pixel. For example, the value "a*w5" obtained by multiplying the pixel value "a" of the input data 410 by the weight w5 and the value "b*w3" obtained by multiplying the pixel value "b" of the input data 410 by the weight w3 may be mapped to the second pixel 452 of the output data 450, and the value of the second pixel 452 may be determined as a*w5+b*w3.

In this way, a deconvolution operation may be performed, and an image with an increased size (resolution) may be output as a result of the deconvolution operation.

Referring back to FIG. 3, the size (resolution) of the second feature maps 320 resulting from the deconvolution may be m times the size (resolution) of the first feature maps 310. As illustrated in FIG. 3, a first image 330 may represent one of the first feature maps 310 (hereinafter referred to as a first feature map) by considering the size of the display and the position of the subpixels arranged in the display, and a second image 340 may represent one of the second feature maps 320 (hereinafter referred to as a second feature map) by considering the size of the display and the positions of the subpixels arranged in the display. The actual size (resolution) of the second feature map may be m times the size (resolution) of the first feature map.

For example, with respect to a first region 350 including R, G, and B, a first pixel value 331 may be a value included in the first feature map, and the other second to ninth pixels 342, 343, 344, 345, 346, 347, 348, and 349 may be values generated through deconvolution based on the pixel values included in the first feature map. Accordingly, the actual size (resolution) of the second feature map may be 3 times the size (resolution) of the first feature map.

Referring back to FIG. 2, the pooling operator 230 may perform a pooling operation on the upscaled second feature maps based on the position information 215 of the subpixels arranged in the display. Accordingly, the pooling operator 230 may generate feature maps for each subpixel. For example, when the subpixels include a first subpixel, a second subpixel, and a third subpixel, the pooling operator 230 may generate first sub feature maps for the first subpixel by performing a pooling operation on the second feature maps based on the position information of the first subpixel. This will be described in detail with reference to FIG. 5.

Figure 5:
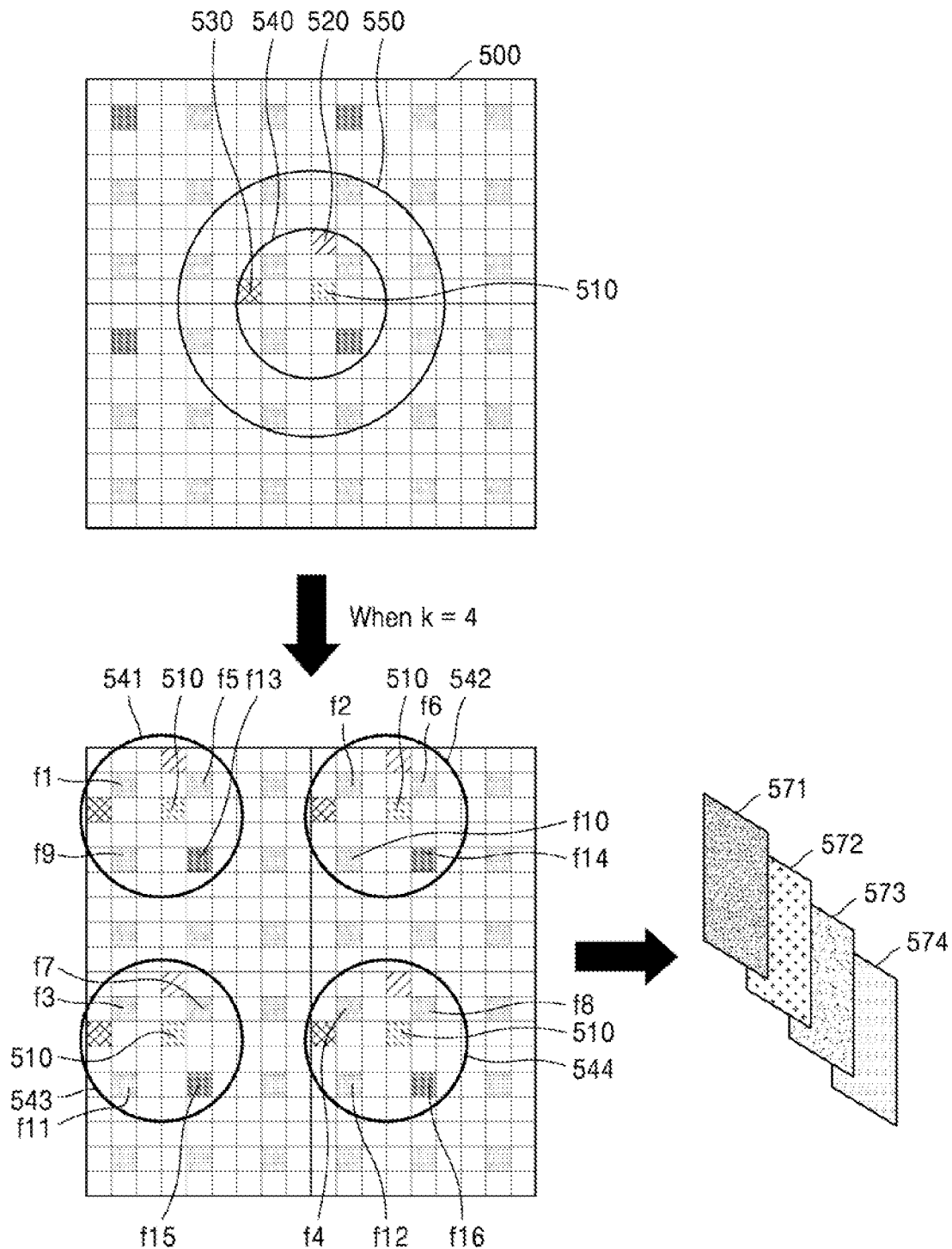
FIG. 5 is a diagram referred to for describing a method of performing a pooling operation by an image processing apparatus, according to an embodiment.

FIG. 5 is a diagram referred to for describing a method of performing a pooling operation by an image processing apparatus, according to an embodiment.

Referring to FIG. 5, a third image 500 may represent some of the features included in the second feature map output from the upscaler 220 by considering the position of subpixels 510, 520, and 530 in the display.

The image processing apparatus 100 according to an embodiment may perform a pooling operation on the second feature map based on the position of the subpixels 510, 520, and 530. For example, the subpixels may include a first subpixel 510 (e.g., a blue subpixel), a second subpixel 520 (e.g., a red subpixel), and a third subpixel 530 (e.g., a green subpixel).

The image processing apparatus 100 may generate sub feature maps for each of the first to third subpixels 510, 520, and 530 by performing a pooling operation on the second feature map based on the position of each of the first to third subpixels 510, 520, and 530. Because a method of generating sub feature maps for each of the first to third subpixels 510, 520, and 530 is the same, only a method of generating sub feature maps for the first subpixel 510 will be described hereinafter.

The image processing apparatus 100 may set the number "k" of sub feature maps to be generated for a subpixel and may set unit regions 540 and 550 based on the set number "k" of sub feature maps. The image processing apparatus 100 may set the unit regions 540 and 550 such that k features having a high proximity to the first subpixel 510 among the features (pixels) included in the second feature map may be included in one unit region. In this case, the high proximity to the first subpixel 510 may mean that the distance to the first subpixel 510 is small.

For example, as illustrated in FIG. 5, when k=4, the unit regions may be set such that four features having a high proximity to the first subpixel 510 among the features included in the second feature map may be included in one unit region 540. Alternatively, when k=12, the unit regions may be set such that 12 features having a high proximity to the first subpixel among the features included in the third feature map may be included in one unit region 550. However, the disclosure is not limited thereto and the unit regions may be set in various ways.

The image processing apparatus 100 may pool features having the same relative position with the first subpixel 510 in each of the unit regions into one sub feature map.

As illustrated in FIG. 5, when k=4, the image processing apparatus 100 may extract first features f1, f2, f3, and f4 having a first position relationship with the first subpixel 510 (e.g., located at the upper left and having a first distance with respect to the first subpixel) in each of unit regions 541, 542, 543, and 544 and generate a first sub feature map 571 including the extracted first features f1, f2, f3, and f4. Also, the image processing apparatus 100 may extract second features f5, f6, f7, and f8 having a second position relationship with the first subpixel 510 (e.g., located at the upper right and having a second distance with respect to the first subpixel 510) in each of the unit regions 541, 542, 543, and 544 and generate a second sub feature map 572 including the extracted second features f5, f6, f7, and f8. Also, the image processing apparatus 100 may extract third features f9, f10, f11, and f12 having a third position relationship with the first subpixel 510 (e.g., located at the lower left and having a third distance with respect to the first subpixel 510) in each of the unit regions 541, 542, 543, and 544 and generate a third sub feature map 573 including the extracted third features f9, f10, f11, and f12. Also, the image processing apparatus 100 may extract fourth features f13, f14, f15, and f16 having a fourth position relationship with the first subpixel 510 (e.g., located at the lower right and having a fourth distance with respect to the first subpixel 510) in each of the unit regions 541, 542, 543, and 544 and generate a fourth sub feature map 574 including the extracted fourth features f13, f14, f15, and f16.

Also, in the same way as described above, the image processing apparatus 100 according to an embodiment may generate four subpixel feature maps for the second subpixel 520 (second sub feature maps) and may generate four subpixel feature maps for the third subpixel 530 (third sub feature maps). As such, the image processing apparatus 100 according to an embodiment may generate k sub feature maps for each of the subpixels according to the set k value.

Referring back to FIG. 2, k sub feature maps for each of the subpixels may be input to the second convolution operator 240. Moreover, the image processing apparatus 100 may determine the order (channel configuration) or weight of the sub feature maps input to the second convolution operator 240 based on the proximity corresponding to each of the sub feature maps. This will be described in detail with reference to FIG. 6.

Figure 6:
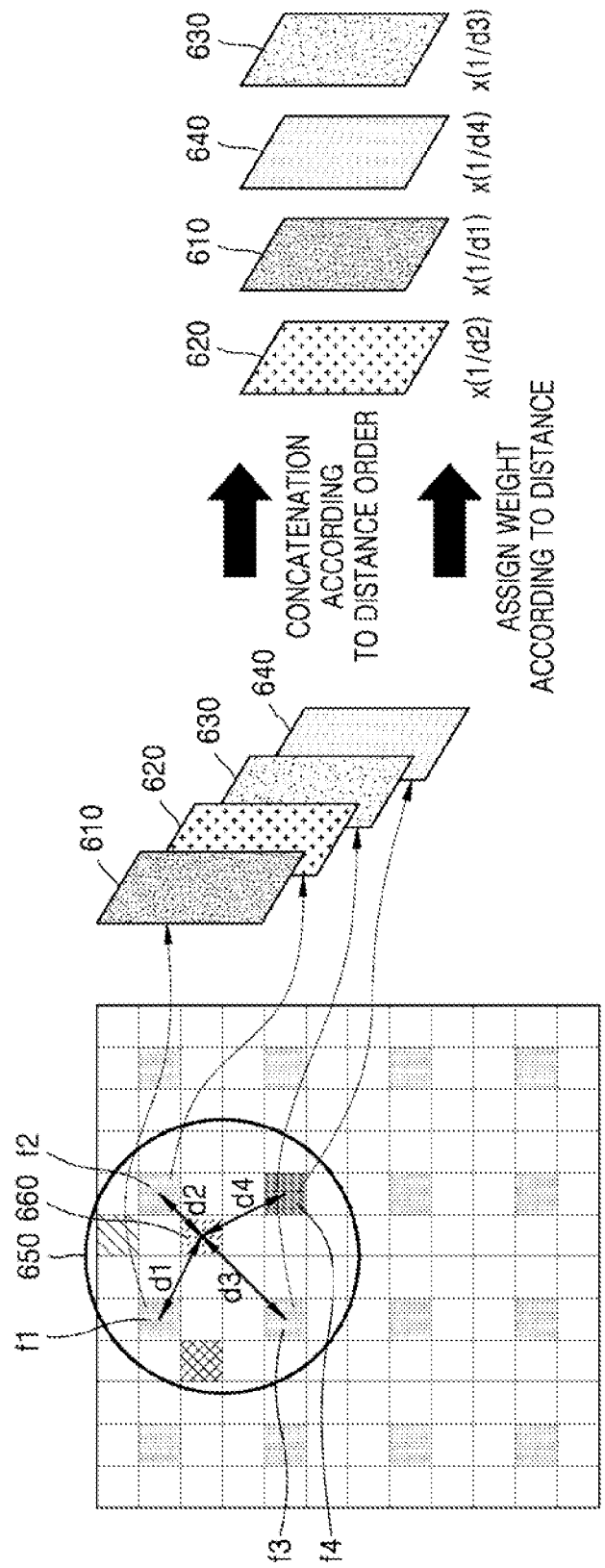
FIG. 6 is a diagram referred to for describing a method of configuring, by an image processing apparatus, a channel input to a second convolution operator, according to an embodiment.

FIG. 6 is a diagram referred to for describing a method of configuring, by an image processing apparatus, a channel input to a second convolution operator, according to an embodiment.

The image processing apparatus 100 according to an embodiment may input k sub feature maps for each of the subpixels to the second convolution operator 240. In this case, the image processing apparatus 100 may determine the input order of the sub feature maps based on the proximity to the subpixel corresponding to each of the sub feature maps.

For example, as illustrated in FIG. 6, a first sub feature map 610 may be a feature map including a first feature f1 having a first position relationship with a first subpixel 660 in a unit region 650, and in this case, the first feature f1 may have a first distance d1 from the first subpixel 660. Also, a second sub feature map 620 may be a feature map including a second feature f2 having a second position relationship with the first subpixel 660 in the unit region 650, and in this case, the second feature f2 may have a second distance d2 from the first subpixel 660. Also, a third sub feature map 630 may be a feature map including a third feature f3 having a third position relationship with the first subpixel 660 in the unit region 650, and in this case, the third feature f3 may have a third distance d3 from the first subpixel 660. Also, a fourth sub feature map 640 may be a feature map including a fourth feature f4 having a fourth position relationship with the first subpixel 660 in the unit region 650, and in this case, the fourth feature f4 may have a fourth distance d4 from the first subpixel 660.

The image processing apparatus 100 according to an embodiment may determine the channel order of the sub feature maps input to the second convolution operator 240 based on the proximity (distance) to the subpixel corresponding to each of the feature maps. The image processing apparatus 100 may determine the channel order of the subpixel maps in ascending order of distance. For example, the image processing apparatus 100 may input a second subpixel map 620 having a second distance d2 as a first channel, and a first subpixel map 610 having a first distance d1 as a second channel, a fourth subpixel map 640 having a fourth distance d4 as a third channel, and a third subpixel map 630 having a third distance d3 as a fourth channel. In this case, the first distance and the fourth distance may be equal to each other, the fourth subpixel map 640 having the fourth distance d4 may be input as the second channel, and the first subpixel map 610 having the first distance d1 may be input as the third channel.

Also, the image processing apparatus 100 according to an embodiment may determine the weight applied to the sub feature maps, based on the proximity (distance) to the subpixel corresponding to each of the sub feature maps.

The image processing apparatus 100 may determine a greater weight value applied to the sub feature map as the distance to the subpixel decreases. For example, as illustrated in FIG. 6, a weight of 1/d2 may be applied to the second sub feature map 620, a weight of 1/d1 may be applied to the first sub feature map 610, a weight of 1/d4 may be applied to the fourth sub feature map 640, and a weight of 1/d3 may be applied to the third sub feature map 630. However, the disclosure is not limited thereto and the image processing apparatus 100 may determine the weight values applied to the sub feature maps in various ways.

Referring back to FIG. 2, the second convolution operator 240 may perform a convolution operation between k sub feature maps for each of the input subpixels and third kernels. Accordingly, the second convolution operator 240 may generate a result image for each of the subpixels. For example, the second convolution operator 240 may generate a first result image for the first subpixel (e.g., Red(N×N) by performing a convolution operation between k first sub feature maps for the first subpixel and the third kernels. The first result image may be an image including the final output values for the first subpixel, but is not limited thereto. Also, the second convolution operator 240 may generate result images (a second result image (e.g., Green(N×N) and a third result image (e.g., Blue(N×N)) for the second subpixel and the third subpixel in the same way as above.

The image processing apparatus 100 may generate a final output image (e.g., an RGB output (N×N)) based on the first to third result images.

Figure 7:
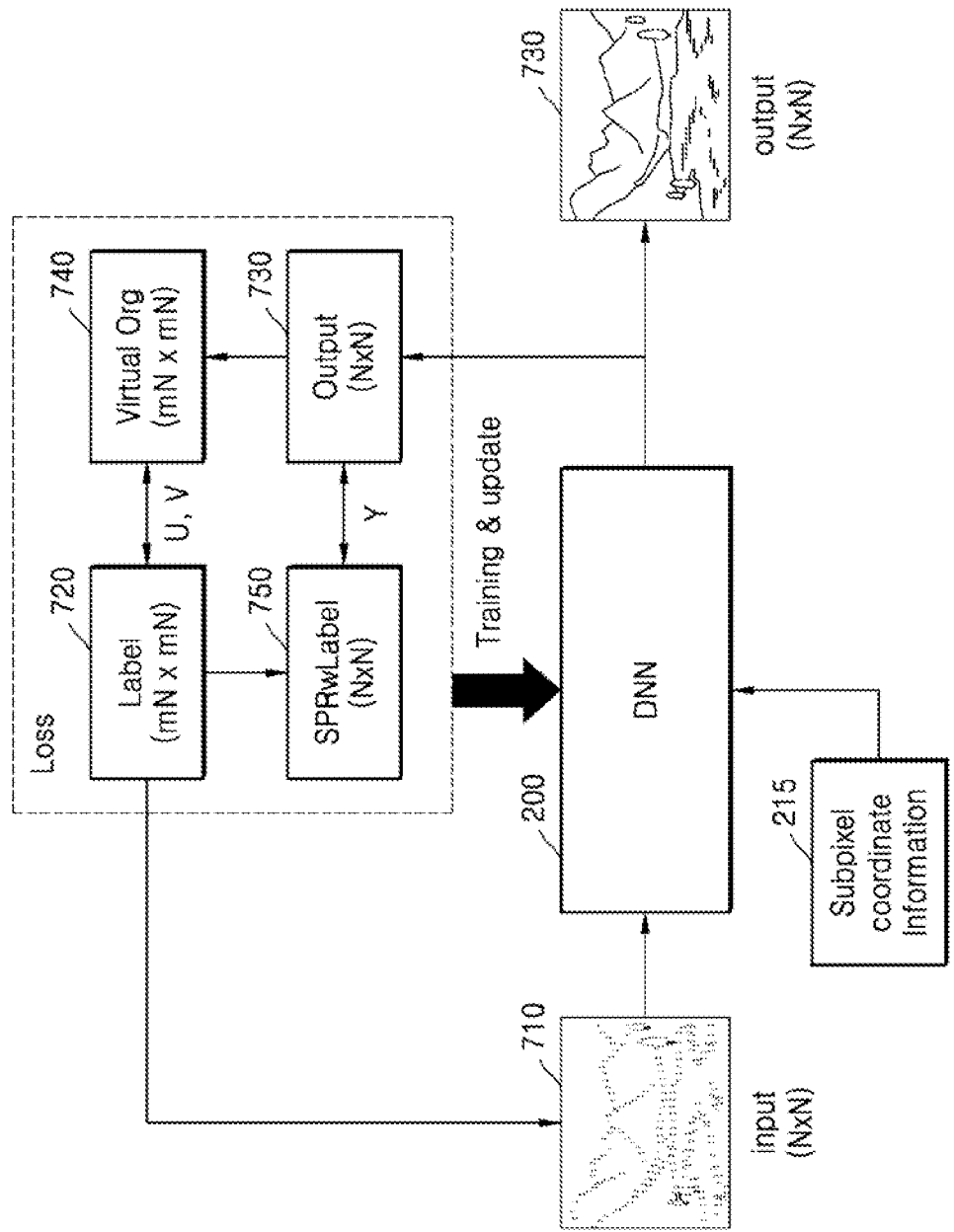
FIGS. 7 to 9 are diagrams referred to for describing a method of training a deep neural network, according to an embodiment.
Figure 8:
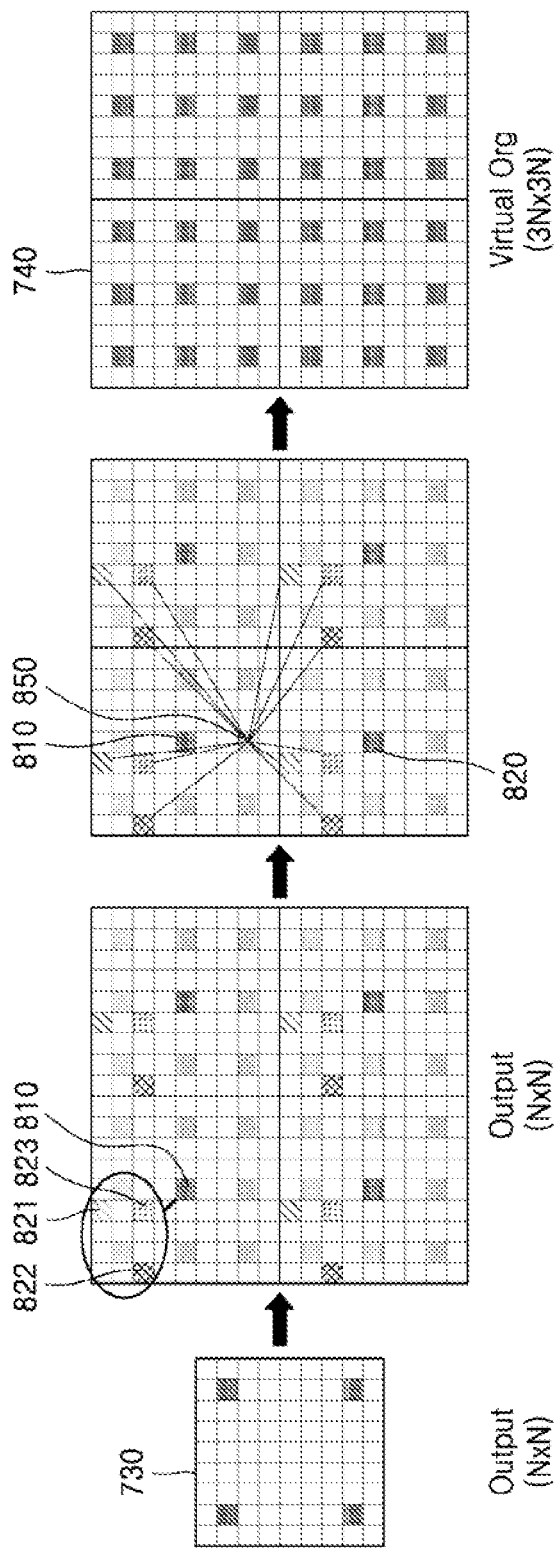
Figure 9:
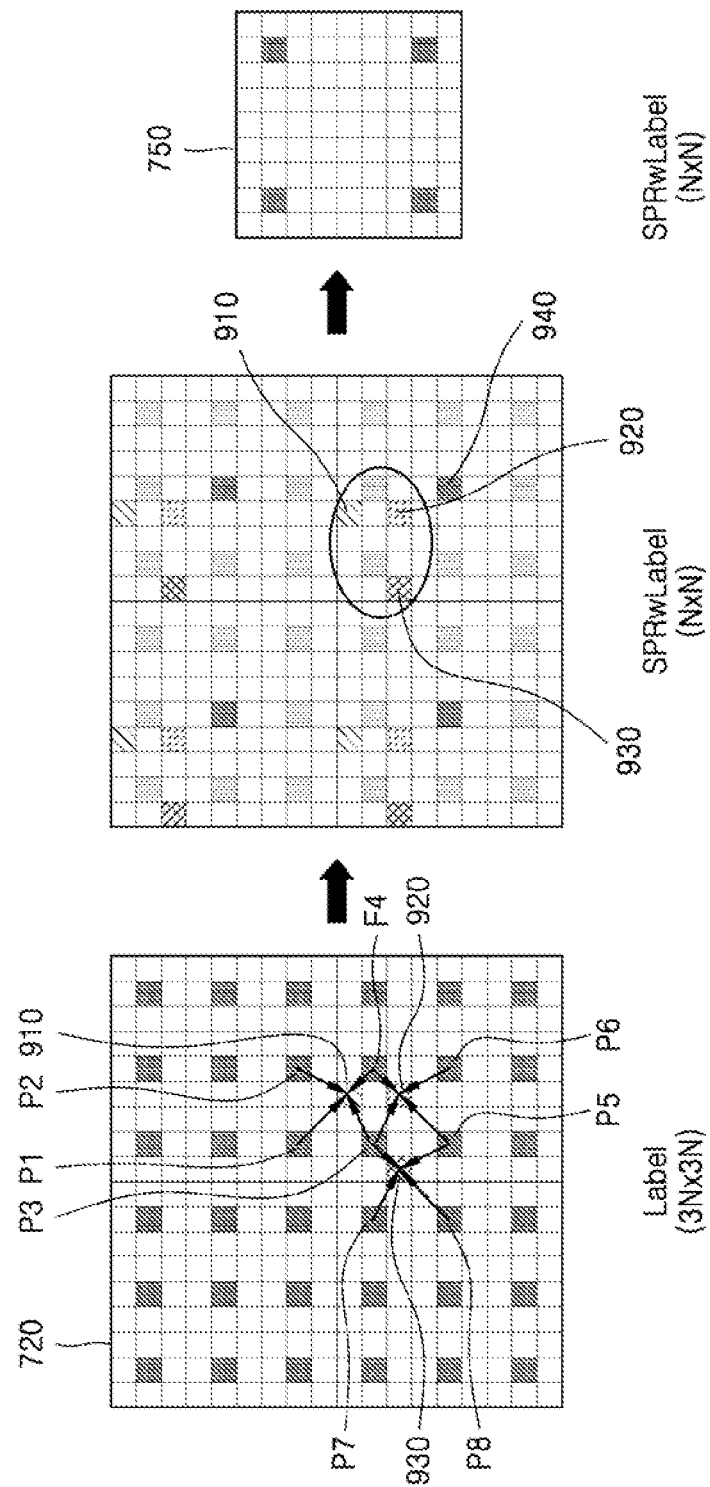

FIGS. 7 to 9 are diagrams referred to for describing a method of training a deep neural network, according to an embodiment.

Referring to FIG. 7, the deep neural network 200 according to an embodiment may be trained by a plurality of training data sets. In this case, the training data set may include input image data 710 and label data 720. The label data 720 may be high-resolution image data having a size of mN×mN, and the input image data 710 may be low-resolution image data having a size of N×N; however, the disclosure is not limited thereto.

The input image data 710 according to an embodiment may be data generated based on the label data 720.

The image processing apparatus 100 according to an embodiment may input the input image data 710 to the deep neural network 200, and the deep neural network 200 may output image data 730 (output image data) obtained by processing the input image data 710.

The image processing apparatus 100 according to an embodiment may generate virtual image data 740 from the output image data 730. The virtual image data 740 may be image data obtained by reproducing an image recognized at a viewing distance when an image is displayed on the display, based on the subpixel values determined by using the output image data 730.

A method of generating the virtual image data 740 will be described with reference to FIG. 8.

Referring to FIG. 8, the deep neural network 200 may generate output image data 730 having the same size (N×N) as the input image data 710. The image processing apparatus 100 may determine values of the subpixels arranged in the display, based on the output image data 730. For example, values of a first subpixel 821 (e.g., a red pixel), a second subpixel 822 (e.g., a green pixel), and a third subpixel 823 (e.g., a blue pixel) may be determined based on a first pixel value 810 included in the output image data 730. When the values of the subpixels are determined, the size (resolution) of the output image data 730 may be increased based on the values of the subpixels. For example, the image processing apparatus 100 may generate a fifth pixel 850 between a first pixel 810 and a second pixel 820 based on the values of the subpixels, and in this case, a fifth pixel value may be determined based on the value of subpixels located around the fifth pixel 850 and the distance between the subpixels and the fifth pixel 850. By using this method, the image processing apparatus 100 may generate virtual image data 740 having a size of mN×mN (e.g., m=3). However, the disclosure is not limited thereto and the image processing apparatus 100 may generate the virtual image data 740 in various ways.

Moreover, referring back to FIG. 7, the image processing apparatus 100 according to an embodiment may generate subpixel rendering image data 750 (SPR image data) from the label data 720.

A method of generating the subpixel rendered image data 750 will be described in detail with reference to FIG. 9.

Referring to FIG. 9, the image processing apparatus 100 may perform subpixel rendering on the label data 720. The image processing apparatus 100 may determine the value of the subpixel based on pixel values located around the subpixel among the pixel values included in the label data 720. For example, the image processing apparatus 100 may determine the value of a first subpixel 910 based on first to fourth pixel values P1, P2, P3, and P4 included in the label data 720 and determine the value of a second subpixel 920 based on third to sixth pixel values P3, P4, P5, and P6. Also, the image processing apparatus 100 may determine the value of a third subpixel 930 based on a third pixel value P3, a fifth pixel value P5, a seventh pixel value P7, and an eighth pixel value P8. The image processing apparatus 100 may determine one pixel value 940 based on the values of the first to third subpixels 910, 920, and 930. The image processing apparatus 100 may reconstruct image data by using the determined pixel values, and in this case, the reconstructed image data 750 (SPR image data) may have a size of N×N. However, the disclosure is not limited thereto and the image processing apparatus 100 may generate the SPR image data 750 in various ways.

Referring back to FIG. 7, the image processing apparatus 100 may convert the label data 720 and the virtual image data 740 having a size of mN×mN from an RGB color space to a YUV color space, calculate the difference (first error) between the U component value of the label data 720 and the U component value of the virtual image data 740, and calculate the difference (second error) between the V component value of the label data 720 and the V component value of the virtual image data 740. In this case, the first error and the second error may correspond to a color error. The U component or V component of the image may be an element affecting color bleeding in the image, and the image processing apparatus 100 may train the deep neural network 200 to minimize the first error and the second error in order to prevent color bleeding.

Also, the image processing apparatus 100 may convert the subpixel rendering image data 750 and the output image data 730 having a size of N×N from the RGB color space to the YUV color space and calculate the difference (third error corresponding to a brightness error) between the Y component value of the subpixel rendering image data 750 and the Y component value of the output image data 730. The Y component of the image may be an element affecting details (texture representation) or aliasing of texts/edges, and the image processing apparatus 100 may train the deep neural network 200 to minimize the third error in order to improve the details and prevent the aliasing of texts or edges.

Also, the image processing apparatus 100 may train the deep neural network 200 to minimize a total error value equal to the sum of the first error, the second error, and the third error in order to improve the overall image quality, such as preventing the color bleeding, improving the details, and improving the text or edge representation. For example, the image processing apparatus 100 may define a loss function as the weighted sum of the first error, the second error, and the third error and adjust the weight of one or more kernels included in the deep neural network 200 such that the loss function may be minimized. However, the disclosure is not limited thereto.

Figure 10:
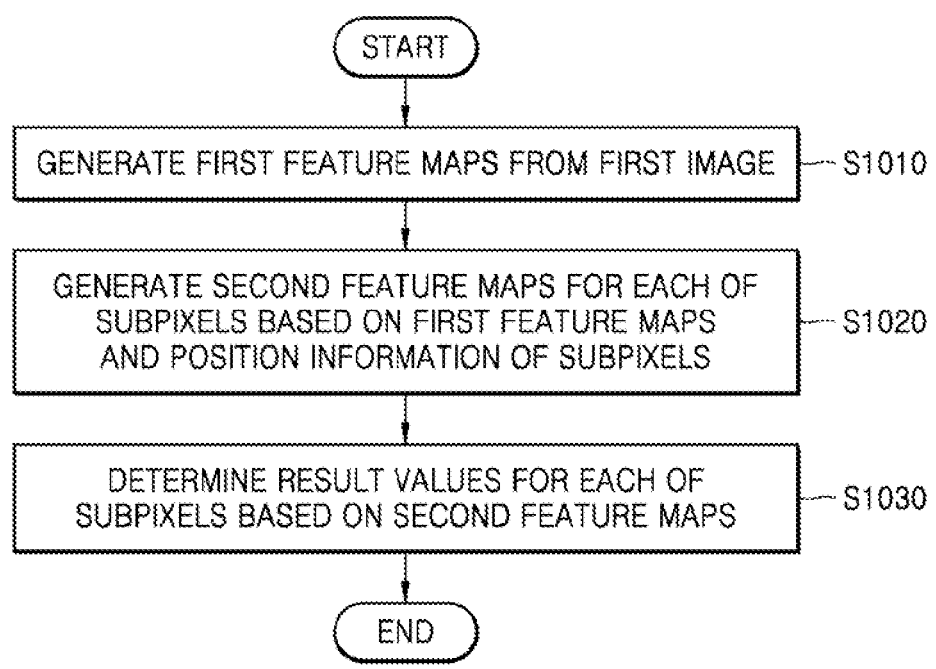
FIG. 10 is a flowchart illustrating a method of operating an image processing apparatus, according to an embodiment.

FIG. 10 is a flowchart illustrating a method of operating an image processing apparatus, according to an embodiment.

Referring to FIG. 10, the image processing apparatus 100 according to an embodiment may generate first feature maps from a first image (S1010).

For example, the image processing apparatus 100 may generate third feature maps by performing a convolution operation between the first image and first kernels. In this case, the size of the first image may be N×N and it may include a plurality of channels. Also, the size of the third feature maps may be N×N, and the number of third feature maps may be f.

The image processing apparatus 100 may generate first feature maps with an increased size (resolution) by upscaling the third feature maps. For example, the image processing apparatus 100 may generate first feature maps by performing a deconvolution operation between the third feature maps and second kernels. The first feature maps generated as a result of the deconvolution operation may be larger than the third feature maps, and the size of the first feature maps may be mN×mN.

The image processing apparatus 100 may generate second feature maps for each of the subpixels based on the first feature maps and position information of each of the subpixels arranged in the display (S1020).

For example, the image processing apparatus 100 may perform a pooling operation on the first feature maps based on the position information of each of the subpixels arranged in the display. Accordingly, the image processing apparatus 100 may generate sub feature maps for each subpixel. For example, when the subpixels include a first subpixel, a second subpixel, and a third subpixel, the image processing apparatus 100 may generate first sub feature maps for the first subpixel by performing a pooling operation on the first feature maps based on the position information of the first subpixel.

The image processing apparatus 100 may generate first sub feature maps based on the position relationship with the first subpixel and the features included in each of the first feature maps. For example, the image processing apparatus 100 may set unit regions such that k features having a high proximity to the first subpixel among the features included in the first feature map may be included in one unit region. The image processing apparatus 100 may pool features having the same relative position with the first subpixel in each of the unit regions into one sub feature map and generate k sub feature maps for the first subpixel (first sub feature maps). This has already been described in detail with reference to FIG. 5, and thus redundant descriptions thereof will be omitted for conciseness.

The image processing apparatus 100 may generate k sub feature maps for the second subpixel (second sub feature maps) and k sub feature maps for the third subpixel (third sub feature maps) in the same way as above.

Also, the image processing apparatus 100 according to an embodiment may determine the weight of each of the first sub feature maps based on the features included in each of the first sub feature maps and the proximity to the first subpixel. This has already been described in detail with reference to FIG. 6, and thus redundant descriptions thereof will be omitted for conciseness. Likewise, the image processing apparatus 100 may determine the weight of each of the second sub feature maps and the third sub feature maps.

The image processing apparatus 100 according to an embodiment may determine the result values for each of the subpixels based on the second feature maps (first to third sub feature maps) (S1030).

For example, the image processing apparatus 100 may perform a convolution operation between the weighted first sub feature maps and third kernels and perform a convolution operation between the weighted second sub feature maps and fourth kernels. Also, the image processing apparatus 100 may perform a convolution operation between the third sub feature maps and fifth kernels. Accordingly, the image processing apparatus 100 may generate result images (first to third result images) for each of the first to third subpixels. The image processing apparatus 100 may output a second image by using the first to third result images.

Figure 11:
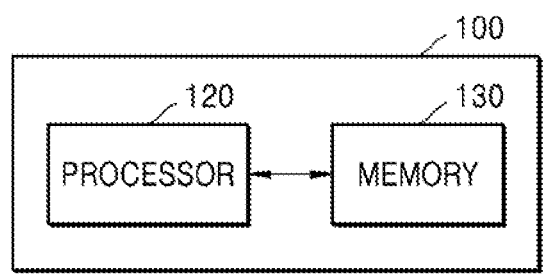
FIG. 11 is a block diagram illustrating a configuration of an image processing apparatus according to an embodiment.

FIG. 11 is a block diagram illustrating a configuration of an image processing apparatus according to an embodiment.

Referring to FIG. 11, the image processing apparatus 100 according to an embodiment may include a processor 120 and a memory 130.

According to an embodiment, the processor 120 may overall control the image processing apparatus 100. According to an embodiment, the processor 120 may execute one or more programs stored in the memory 130.

According to an embodiment, the memory 130 may store various data, programs, or applications for driving and controlling the image processing apparatus 100. The program stored in the memory 130 may include one or more instructions. The application or program (one or more instructions) stored in the memory 130 may be executed by the processor 120.

According to an embodiment, the processor 120 may output a second image by processing a first image input to a deep neural network, by using the deep neural network. In this case, the deep neural network may be the deep neural network illustrated and described in FIGS. 2 to 9.

For example, the processor 120 may generate first feature maps by performing a convolution operation between the first image and first kernels. In this case, the size of the first image may be N×N and it may include a plurality of channels. Also, the size of the first feature maps may be N×N, and the number of first feature maps may be f.

The processor 120 may generate second feature maps with an increased size (resolution) by upscaling the first feature maps. For example, the processor 120 may generate second feature maps by performing a deconvolution operation between the first feature maps and second kernels. The size of the second feature maps generated as a result of the deconvolution operation may be mN×mN.

The processor 120 may generate k sub feature maps for each of the subpixels based on the second feature maps and the position information of each of the subpixels arranged in the display. For example, the processor 120 may generate k sub feature maps for each of the subpixels by performing a pooling operation on the second feature maps based on the position information of each of the subpixels arranged in the display. This has already been described in detail with reference to FIG. 5, and thus redundant descriptions thereof will be omitted for conciseness.

According to an embodiment, the processor 120 may determine result values for each of the subpixels based on the sub feature maps. For example, the processor 120 may generate a first result image for the first subpixel by performing a convolution operation between k sub feature maps for the first subpixel and third kernels. Also, the processor 120 may generate a second result image and a third result image for the second subpixel and the third subpixel in the same way as above.

According to an embodiment, the processor 120 may output a second image by using the first to third result images.

Figure 12:
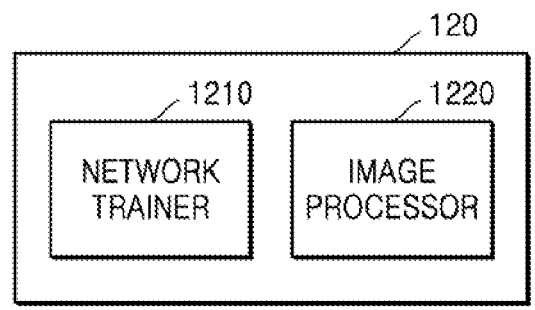
FIG. 12 is a block diagram of a processor according to an embodiment.

FIG. 12 is a block diagram of a processor according to an embodiment.

Referring to FIG. 12, the processor 120 according to an embodiment may include a network trainer 1210 and an image processor 1220.

The network trainer 1210 may train a deep neural network according to an embodiment by using a plurality of training data sets. In this case, the training data set may include input image data and label data. The label data may be high-resolution image data having a size of mN×mN, and the input image data may be low-resolution image data having a size of N×N; however, the disclosure is not limited thereto. Also, the network trainer 1210 may generate input image data by using the label data.

The network trainer 1210 may obtain output image data by inputting the input image data to the deep neural network. The network trainer 1210 may generate virtual image data from the output image data. The virtual image data may be image data obtained by reproducing an image recognized at a viewing distance when an image is displayed on the display, based on the subpixel values determined by using the output image data. Because a method of generating the virtual image data has already been described in detail with reference to FIG. 8, redundant descriptions thereof will be omitted for conciseness.

Also, the network trainer 1210 may generate subpixel rendering image data by subpixel-rendering the label data. Because a method of generating the subpixel rendering image data has already been described in detail with reference to FIG. 9, redundant descriptions thereof will be omitted for conciseness.

The network trainer 1210 may train a deep neural network according to an embodiment, based on the difference in the U component value and the V component value in the label data and the virtual image data having a size of mN×mN and the difference in the component value Y in the subpixel rendered image data and the output data having a size of N×N. A method of training the deep neural network has already been described in detail with reference to FIGS. 7 to 9, and thus redundant descriptions thereof will be omitted for conciseness.

The network trainer 1210 may store a trained network (e.g., a deep neural network) in the memory of the image processing apparatus. Alternatively, the network trainer 1210 may store the trained network in the memory of a server connected to the image processing apparatus through a wired or wireless network.

The memory storing the trained network may also store, for example, commands or data related to at least one other component of the image processing apparatus 100. Also, the memory may store software and/or programs. The program may include, for example, a kernel, middleware, an application programming interface (API), and/or an application program (or "application").

The image processor 1220 may process the input first image by using the deep neural network trained by the network trainer 1210. For example, the image processor 1220 may extract feature information about the first image by using the trained deep neural network and perform subpixel rendering based on the extracted feature information and the position information of the subpixels arranged in the display. Accordingly, the image processor 1220 may perform subpixel rendering adaptive to the characteristics of the first image.

Meanwhile, at least one of the network trainer 1210 and the image processor 1220 of FIG. 12 may be manufactured in the form of a hardware chip and mounted on the image processing apparatus 100. For example, at least one of the network trainer 1210 and the image processor 1220 may be manufactured in the form of a dedicated hardware chip for artificial intelligence (AI) or may be manufactured as a portion of a general-purpose processor (e.g., a central processing unit (CPU) or an application processor) or a graphic processor (e.g., a graphic processing unit (GPU)) and mounted on various image processing apparatuses described above.

In this case, the network trainer 1210 and the image processor 1220 may be mounted on one image processing apparatus or on respective separate image processing apparatuses. For example, one of the network trainer 1210 and the image processor 1220 may be included in the image processing apparatus, and the other may be included in the server.

Also, at least one of the network trainer 1210 and the image processor 1220 may be implemented as a software module. When at least one of the network trainer 1210 and the image processor 1220 is implemented as a software module (or a program module including instructions), the software module may be stored in a non-transitory computer-readable recording medium. Also, in this case, at least one software module may be provided by an operating system (OS) or may be provided by a certain application. Alternatively, some of at least one software module may be provided by an operating system (OS), and the others may be provided by a certain application.

Meanwhile, the block diagrams of the image processing apparatus 100 and the processor 120 illustrated in FIGS. 11 and 12 are block diagrams for an embodiment of the disclosure. Each component of the block diagram may be integrated, added, or omitted according to the specifications of the image processing apparatus 100 that are actually implemented. That is, when necessary, two or more components may be combined into one component, or one component may be divided into two or more components. Also, functions performed by the respective blocks are for describing embodiments, and particular operations or devices thereof do not limit the scope of the disclosure.

The operation method of the image processing apparatus according to an embodiment may be stored in a computer-readable recording medium by being implemented in the form of program commands that may be performed by various computer means. The computer-readable recording medium may include program instructions, data files, and data structures either alone or in combination. The program commands recorded on the computer-readable recording medium may be those that are especially designed and configured for the disclosure, or may be those that are known and available to computer programmers of ordinary skill in the art. Examples of the computer-readable recording medium include magnetic media such as hard disks, floppy disks, and magnetic tapes, optical media such as CD-ROMs and DVDs, and magneto-optical media such as floptical disks, and hardware apparatuses such as ROMs, RAMs, and flash memories particularly configured to store and execute program instructions. Examples of the program instructions may include not only machine language code generated by a compiler but also high-level language code that may be executed by a computer by using an interpreter or the like.

Also, the image processing apparatus and the operation method thereof according to the described embodiments may be included and provided in a computer program product. The computer program product may be traded as a product between a seller and a buyer.

The computer program product may include a S/W program and a computer-readable storage medium with a S/W program stored therein. For example, the computer program product may include products in the form of S/W programs (e.g., downloadable apps) electronically distributed through manufacturers of electronic devices or electronic markets (e.g., Google Play Store and App Store). For electronic distribution, at least a portion of the S/W program may be stored in a storage medium or may be temporarily generated. In this case, the storage medium may be a storage medium of a server of a manufacturer, a server of an electronic market, or a relay server for temporarily storing the S/W program.

In a system including a server and a client device, the computer program product may include a storage medium of the server or a storage medium of the client device. Alternatively, when there is a third device (e.g., a smartphone) communicatively connected to the server or the client device, the computer program product may include a storage medium of the third device. Alternatively, the computer program product may include the S/W program itself that is transmitted from the server to the client device or the third device or transmitted from the third device to the client device.

In this case, one of the server, the client device, and the third device may execute the computer program product to perform the method according to the described embodiments. Alternatively, two or more of the server, the client device, and the third device may execute the computer program product to perform the method according to the described embodiments in a distributed manner.

For example, the server (e.g., a cloud server or an artificial intelligence (AI) server) may execute the computer program product stored in the server, to control the client device communicatively connected to the server to perform the method according to the described embodiments.

Although embodiments have been described above in detail, the scope of the disclosure is not limited thereto and various modifications and improvements made by those of ordinary skill in the art by using the basic concept of the disclosure defined in the following claims are also included in the scope of the disclosure.

The invention claimed is:

1. An image processing apparatus for performing subpixel rendering by using one or more deep neural networks comprising:
   a memory storing one or more instructions; and
   a processor configured to execute the one or more instructions stored in the memory to;
   generate first feature maps by performing convolution operation between a first image and first kernels included in the one or more deep neural networks;
   generate second feature maps by upscaling the first feature maps;
   generate third feature maps for each of subpixels based on the second feature maps and position information of each of the subpixels arranged in a display;
   generate result image for each of the subpixels by performing convolution operation between the third feature maps and second kernels included in the one or more deep neural networks; and
   output a second image based on the result image for each of the subpixels.

2. The image processing apparatus of claim 1, wherein the one or more deep neural networks include a deconvolution layer, and
   the processor upscales the first feature maps by performing a deconvolution operation between the third feature maps and third kernels in the deconvolution layer.

3. The image processing apparatus of claim 1, wherein the subpixels include first to third subpixels, and
   the processor generates first sub feature maps for first subpixel by grouping features having a same position relationship with the first subpixel among features included in the second feature maps, generates second sub feature maps for second subpixel by grouping features having a same position relationship with the second subpixel among features included in the second feature maps, and generates third sub feature maps for third subpixel by grouping features having a same position relationship with the third subpixel among features included in the third feature maps.

4. The image processing apparatus of claim 3, wherein the processor
   determines a weight of each of the first sub feature maps based on a proximity of features included in each of the first sub feature maps to the first subpixel,
   determines a weight of each of the second sub feature maps based on a proximity of features included in each of the second sub feature maps to the second subpixel,
   determines a weight of each of the third sub feature maps based on a proximity of features included in each of the third sub feature maps to the third subpixel, and
   generate result image for each of the subpixels by applying weights to each of the first to third sub feature maps.

5. The image processing apparatus of claim 3, wherein the processor generates a first result image for the first subpixel by performing a convolution operation between the first sub feature maps and fourth kernels included in the second kernels, generates a second result image for the second subpixel by performing a convolution operation between the second sub feature maps and fifth kernels included in the second kernels, generates a third result image including third result values for the third subpixel by performing a convolution operation between the third sub feature maps and fifth kernels, and wherein the first result image includes output values for the first subpixel, the second result image includes output values for the second subpixel, and the third result image includes output values for the third subpixel.

6. The image processing apparatus of claim 1, wherein the first image and the second image have a same resolution.

7. A method of operating an image processing apparatus that performs subpixel rendering by using one or more deep neural networks, the method comprising:

generating first feature maps by performing convolution operation between a first image and first kernels included in the one or more deep neural networks;

generating second feature maps by upscaling for the first feature maps;

generating third feature maps for each of subpixels based on the second feature maps and position information of each of the subpixels arranged in a display;

generating result image for each of the subpixels by performing convolution operation between the third feature maps and second kernels included in the one or more deep neural networks; and outputting a second image based on the result image for each of the subpixels.

8. The method of claim 7, wherein the one or more deep neural networks include a deconvolution layer, and the generating of the second feature maps comprises performing a deconvolution operation between the first feature maps and third kernels in the deconvolution layer.

9. The method of claim 7, wherein the subpixels include first to third subpixels, and the generating of the second feature maps comprises:

generating first sub feature maps for first subpixel by grouping same position relationship with the first subpixel among features included in the second feature maps;

generating second sub feature maps for second subpixel by grouping features having a same position relationship with the second subpixel among features included in the second feature maps; and generating third sub feature maps for third subpixel by grouping features having a same position relationship with the third subpixel among features include in the first feature maps.

* * * * *